May 22, 1928.  
J. COMTE  
1,670,345  
PROCESS FOR THE MANUFACTURE OF AERIAL METAL PROPELLERS  
Filed May 11, 1925   3 Sheets-Sheet 1
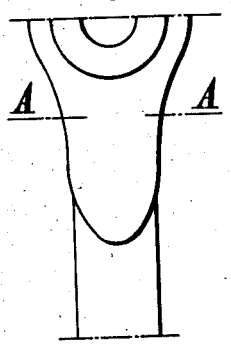
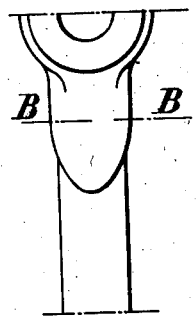
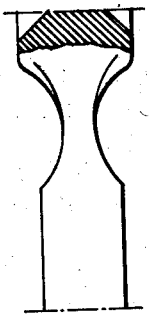
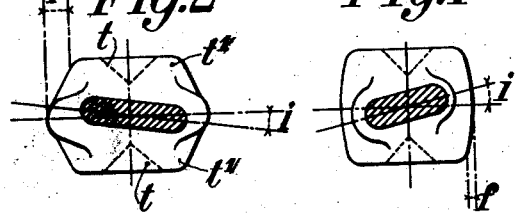
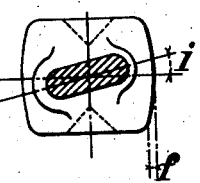
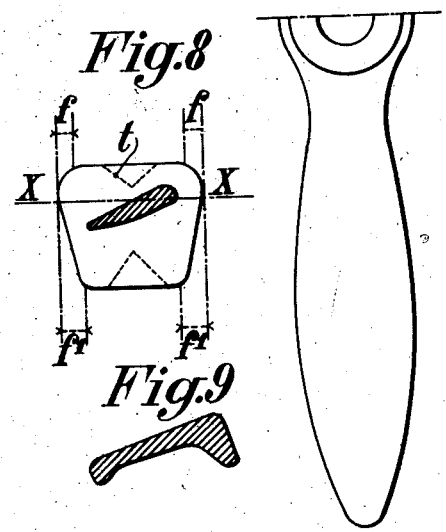
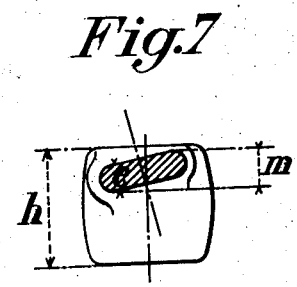
Inventor  
J. Comte  
By Marks & Clerk  
Attys.

May 22, 1928. 1,670,345
J. COMTE
PROCESS FOR THE MANUFACTURE OF AERIAL METAL PROPELLERS
Filed May 11, 1925   3 Sheets-Sheet 2
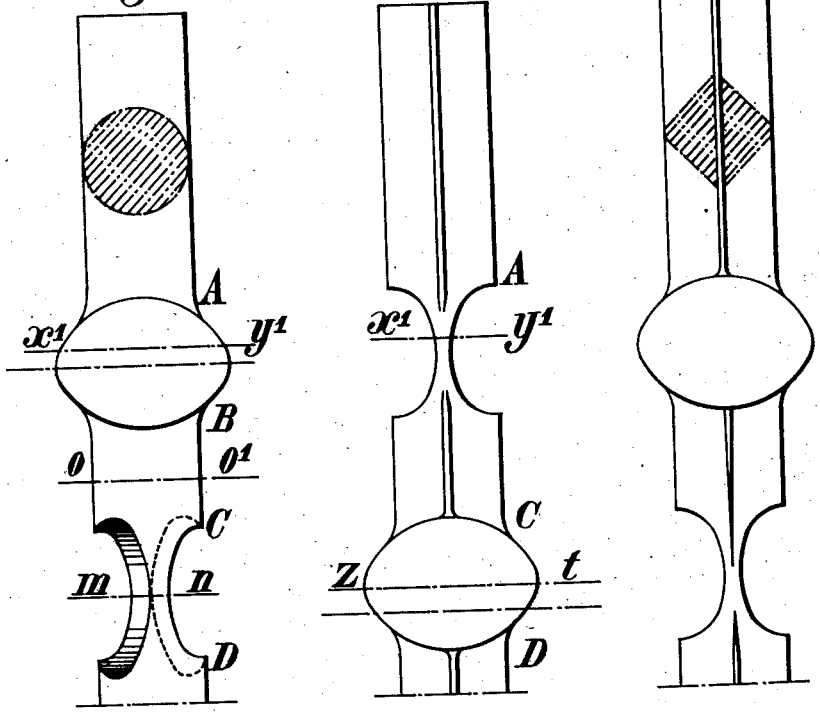
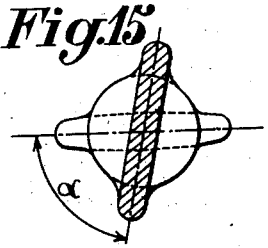
Inventor
J. Comte
By Marks & Clerk
Attys.

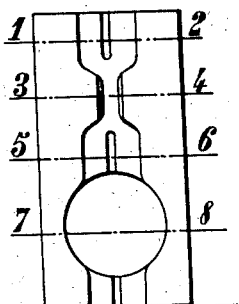
Fig.25
Fig.31 Fig.32
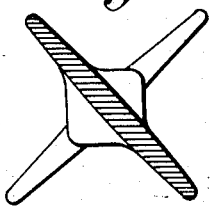
Fig.33
Fig.26
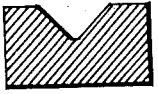
Fig.28
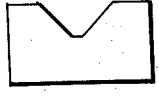
Fig.30
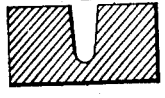
Fig.27
Fig.29
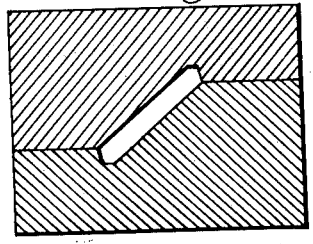
Fig.34
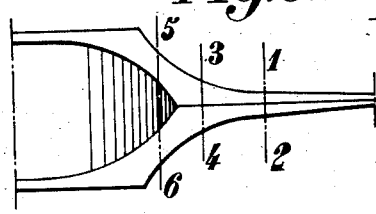
Fig.37 Fig.35
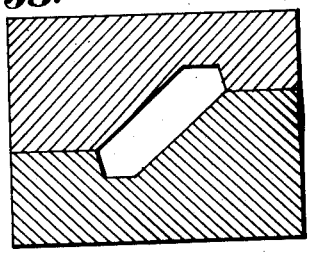
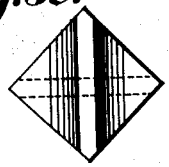
Fig.38
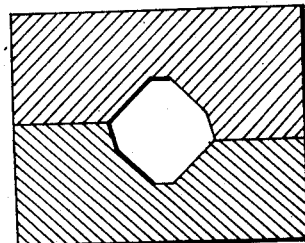
Fig.36
Inventor
J. Comte Patented May 22, 1928.

1,670,345

UNITED STATES PATENT OFFICE.

JEAN COMTE, OF NEUILLY-SUR-SEINE, FRANCE.

PROCESS FOR THE MANUFACTURE OF AERIAL METAL PROPELLERS.

Application filed May 11, 1925, Serial No. 29,591, and in France May 15, 1924.

The present invention relates to a process for the manufacture of metallic propellers for aircraft and more particularly of propellers made of light metals or alloys of light metals.

This process of manufacture has for its object to obtain propellers in one piece, that is to say obtained from one mass or body of metal, by remedying the serious inconveniences of the various known processes.

These various processes come back to the following standard process.

A piece of metal or blank is obtained by forging and has a central hub on either side of which extend in one and the same theoretical plane at right angles to the axis of the hub, blades which have no pitch. These blades are then twisted in the transverse direction for giving them the required pitch.

The various known processes differ between them in the manner and the means for obtaining either the blank by forging as previously indicated, or the torsion of the blades.

In modern propellers for aircraft, there is more and more tendency to give to the blades a constant pitch, so that the inclination of the active surfaces of the latter is so much the more pronounced the nearer to the hub; this inclination is maximum at the place of the connection of the blade with the hub. It results therefrom that the most twisted portion of the blade is that nearest the hub. In one and the same section, the fibers of the metal have been elongated so much the more as their distance to the center of the blade is greater, this having for result:

1. Of destroying the parallelism between the fibers and to thus give to these latter a different direction of the tensions produced by centrifugal force.

The fibers of the central portion of the section under consideration having only been subjected to a rotation are exaggeratedly strained owing to the elongation of the extreme fibers.

2. At the high speeds of rotation adopted, the centrifugal force tends to straighten the end fibers and to thus cause the inclination of the entire blade to vary.

Torsion is an extremely difficult operation to effect with light metals such as magnesium, aluminum or alloys mainly composed of these metals which are fragile and are cracked with an extreme facility. Cracks are practically unavoidable if, for the purpose of increasing the active surface of the blade, it is desired to give, by a marked torsion, the suitable inclination to the elements of the blades adjacent to this hub.

The stresses imposed on modern propellers for aircraft are such, owing to the high angular speed at which they rotate when in use, that the processes of manufacture with torsion have nearly been given up.

For the purpose of remedying these serious inconveniences, manufacturers have given up the manufacture of the propeller in one piece and have set their blade according to the desired inclination by a suitable assemblage on an independent hub.

The process of manufacture forming the subject-matter of the invention allows to obtain metallic propellers in one piece, free from the above inconveniences. This process is characterized in that a metal billet is crushed, in a die, for giving in a single operation, a hub with two blade starting portions which have already their definitive profile and orientation relatively to the hub and the ends of which are subsequently forged.

The accompanying drawing illustrates, by way of example only, a form of carrying out the process above characterized.

Fig. 1 is a half plan view of a blank obtained by the first phase or operation of the process.

Fig. 2 is a cross section made according to line A—A of Fig. 1.

Fig. 3 is a view similar to Fig. 1 showing a constructional modification.

Fig. 4 is a cross section made according to line B—B of Fig. 3.

Fig. 5 is a half side view corresponding to Fig. 3, with partial section made for showing the central cavities of the hub.

Fig. 6 is a half plan view of a finished propeller.

Fig. 7 is a view corresponding to Fig. 4 and showing a constructional modification.

Figs. 8 and 9 illustrate details concerning constructional modifications.

Figs. 10, 11, 12, 13 show cross sections of billets which can be used for the manufacture of propellers in accordance with the process forming the subject-matter of this invention.

Fig. 14 illustrates a propeller blank prepared before passing in the die.

Fig. 15 is a cross section made according to line M—N of Fig. 14.

Figs. 16 to 21 illustrate various shapes of sections obtained with the blank of Fig. 14, these sections being made according to line $x_1\ y_1$ of Fig. 14 and of Fig. 22.

Fig. 22 is an elevation of a propeller blank in case the angle formed by the blades is of 90 degrees.

Fig. 23 is a corresponding side view.

Fig. 24 is a cross section made according to line $z$—$t$ of Fig. 22.

Fig. 25 shows in top plan view one of the two lower dies serving to form a blank substantially similar to that of Figs. 22 and 23.

Figs. 26, 27, 28 and 29 are cross sections made respectively according to lines 1—2, 3—4, 5—6 and 7—8 of Fig. 25.

Fig. 30 is an end view corresponding to Fig. 25.

Fig. 31 shows in elevation the central portion of a finished propeller obtained with the blank of Figs. 22 and 23.

Fig. 32 is a corresponding plan view and Fig. 33 a corresponding end view.

Figs. 34, 35, 36 are cross sections of dies serving to obtain the blank shown in Figs. 37 and 38, these sections corresponding to lines 1—2, 3—4 and 5—6 of Fig. 37, respectively.

The cross section of the billet of metal from which is made the propeller is suitably chosen according to the shape and dimensions of the hub to be obtained. This billet, brought to the required temperature, is swaged in order to present when coming out of the die, a hub having its definitive shape with blade starting portions, the connecting portions of which with the hub have also their final shape. The fibers of the connecting zones from the blades to the hub have not been subjected during swaging to any torsion; they have simply been pressed together and drawn, this constituting for alloys of light metals suitable for the construction of propellers, a very important refining and consequently a favourable mechanical treatment.

From this fact, all the fibers of the metal have maintained their primitive direction and have remained directed in the direction of the centrifugal stress. All the points of one and the same section are therefore normally strained.

The blades, where they come out of the hub, having their definitive section and inclination, all machining and grinding work will be practically done away with in a region which is very difficult to grind and to balance.

The swaging tools forming only a very small portion of the blades and in vicinity to the hub, that is to say in a zone where a variation of a few degrees does not appreciably diminish the efficiency of the propeller, will allow to manufacture in series propellers of somewhat different characteristics.

These tools are not costly and the cost price of the propeller is very reduced.

The blade can be used throughout its length, this increasing the efficiency of the propeller.

In Figs. 1 to 5 is shown an example of propeller blank obtained after swaging of the initial billet.

In the present process use can be made of all the resources of the technic of swaging and forging. One may start for instance from a billet the height of which is smaller than that of the hub of the propeller to be obtained. For that purpose, punches in the die form in the hub central cavities $t$ which will upset the metal towards the zones $t'$. The importance of the forging work of the blades beyond the zones connecting them to the hub can thus be reduced.

The shape of the hub is variable. Generally speaking if X—X is the joining plane adopted for the elements of the die or matrix, the hub will present slopes $f$ and $f^1$. The height of the hub is preferably measured on an axis parallel to the theoretical axis of the hub, in proximity to the connection of the blade with the hub. The shape of the cross section of the starting portions of the blades can be chosen by taking in account the required conditions of rigidity, or of lesser head resistance. Figs. 8 and 9 illustrate, by way of example, shapes of section it is possible to obtain.

The blanks obtained by matrix and substantially similar to those shown in Figs. 1 to 4, in which the starting portions of the blades connecting them to the hub present an inclination $i$ (Figs. 2 and 4), are subjected to the second stage of the present process which consists in shaping up, by swaging or forging by any suitable means and stock of tools, the blades beyond the starting connecting portions which are finished by the first operation of the process.

It will be noted that the cross sections of the propeller, from the hub up to the end of the blade, can vary according to any desired law and that the invention relates to the application of the process which has just been set forth to the manufacture of propellers the blades of which can have any of the profiles the computation and experience of which have shown the advantages concerning the efficiency.

The axis of symmetry of the blades, if they admit an axis of symmetry, can pass through the center of the hub, as shown in Figs. 2 and 4, or can be displaced relatively to this center, as shown in Fig. 7.

It will be sometimes useful to shape up a blank before placing the bloom or billet in the final matrix. This blank can be prepared by casting; this cast blank can even be drawn or upset by forging. If desired, in order that the final matrices may not be strained too much, it is possible to provide blank matrices which, so to speak, will prepare the work of the final matrices.

Thus, in the example of Figs. 14 and 15, the two parts A—B and C—D, situated on either side of the central part O—O¹ of the bloom, will first be roughened down as just stated by means of any suitable stock of tools. These two parts form together a certain angle.

The sections $x_1$, $y_1$ of the roughened down parts can have any shape and, for instance, one of the shapes shown in Figs. 16, 17, 18, 19, 20, 21.

The shape of these sections will be very similar to their final shape on the finished propeller.

The central part B—C will be consequently provided for permitting both the swaging of the hub and the connection of the blades to the hub as previously indicated.

It is obvious that if it is desired to roughen down the parts A—B and C—D throughout the length of the blades before stamping the hub the process is also integrally applicable.

When the blades form together an angle of 90 degrees, blanks can be prepared as shown in Figs. 22 to 24.

These blanks can be obtained by roughing down matrices.

When the angle of the blades is of 90 degrees and when the shape of the latter allows it, it is possible, if desired to cause the joint of the two matrices to pass at s—u (Fig. 24). Figures 25 to 30 illustrate by way of example a lower half-matrix made as just described.

The blank obtained is placed in the final matrix and a member such as illustrated in Figs. 31, 32 and 33 is obtained.

For obtaining a blank such as that shown in Figs. 37 and 38, use can be made of two matrices such as those illustrated in vertical section in Figs. 34, 35 and 36.

Although for greater clearness in the drawing, a propeller having two blades has been illustrated, it is obvious that the process applies without modification to the manufacture of aerial propellers having more than two blades. In this case, one will start from a blank already prepared by forging or by casting and having, in the particular case of a propeller provided with four blades, a cruciform section. The swaging of the hub and of the starting portions of the blades will be effected in the same conditions. The same will be done for the blades.

It is to be noted that the finished propeller must be capable of being mounted on the driving part of its engine with or without the intermediary of a sleeve made of hard metal and that, according to the locking device used, it is possible, without departing from the scope of the invention, to produce on the hub, upon the first operation of swaging, any suitable bearing portion capable of being externally or internally screw threaded for receiving the locking member on the propeller carrying nose.

What I claim as my invention and desire to secure by Letters Patent is:—

A method for manufacturing screw propellers consisting in swaging a metal blank in order to provide in one single operation a hub with two stems forming blades having a predetermined pitch in such a manner as to avoid any torsion of the metal blank and then swaging the stems in order to complete blades.

In testimony whereof I have signed my name to this specification.

JEAN COMTE.